(12) United States Patent
Wang et al.

(10) Patent No.: US 11,996,112 B2
(45) Date of Patent: May 28, 2024

(54) METHOD AND APPARATUS FOR VOICE CONVERSION AND STORAGE MEDIUM

(71) Applicant: UBTECH ROBOTICS CORP LTD, Shenzhen (CN)

(72) Inventors: Ruotong Wang, Shenzhen (CN); Zhichao Tang, Shenzhen (CN); Dongyan Huang, Shenzhen (CN); Jiebin Xie, Shenzhen (CN); Zhiyuan Zhao, Shenzhen (CN); Yang Liu, Shenzhen (CN); Youjun Xiong, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 804 days.

(21) Appl. No.: 17/084,672

(22) Filed: Oct. 30, 2020

(65) Prior Publication Data

US 2021/0193160 A1    Jun. 24, 2021

Related U.S. Application Data

(63) Continuation of application No. PCT/CN2019/127948, filed on Dec. 24, 2019.

(51) Int. Cl.
*G10L 25/21*  (2013.01)
*G06N 20/00*  (2019.01)
(Continued)

(52) U.S. Cl.
CPC ........... *G10L 21/013* (2013.01); *G06N 20/00* (2019.01); *G10L 19/02* (2013.01); *G10L 25/03* (2013.01);
(Continued)

(58) Field of Classification Search
CPC ..... G10L 15/063; G10L 15/065; G10L 15/07; G10L 15/16; G10L 2021/0135;
(Continued)

(56) References Cited

U.S. PATENT DOCUMENTS 10,186,251 B1 * 1/2019 Mohammadi ........... G10L 15/26
10,453,476 B1 * 10/2019 Aryal ...................... G10L 25/30
(Continued)

FOREIGN PATENT DOCUMENTS

CN    109377978 A    2/2019

OTHER PUBLICATIONS

Kobayashi et al, "Open-Source Voice Conversion Software", InOdyssey Jun. 26, 2018 (pp. 203-210). (Year: 2018).*
(Continued)

*Primary Examiner* — Olujimi A Adesanya

(57) ABSTRACT

The present disclosure discloses a voice conversion method. The method includes: obtaining a to-be-converted voice, and extracting acoustic features of the to-be-converted voice; obtaining a source vector corresponding to the to-be-converted voice from a source vector pool, and selecting a target vector corresponding to the target voice from the target vector pool; obtaining acoustic features of the target voice output by the voice conversion model by using the acoustic features of the to-be-converted voice, the source vector corresponding to the to-be-converted voice, and the target vector corresponding to the target voice as an input of the voice conversion model; and obtaining the target voice by converting the acoustic features of the target voice using a vocoder. In addition, a voice conversion apparatus and a storage medium are also provided.

17 Claims, 9 Drawing Sheets

(51) Int. Cl.
*G10L 19/02* (2013.01)
*G10L 21/013* (2013.01)
*G10L 25/03* (2013.01)
*G10L 25/24* (2013.01)
*G10L 25/27* (2013.01)
*G10L 25/75* (2013.01)

(52) U.S. Cl.
CPC ...... *G10L 25/27* (2013.01); *G10L 2021/0135* (2013.01)

(58) Field of Classification Search
CPC ..... G10L 21/003; G10L 25/30; G06N 3/0454; G06N 3/08; G06N 3/082; G06N 3/088
See application file for complete search history.

(56) References Cited

U.S. PATENT DOCUMENTS

| | | | | |
|---|---|---|---|---|
| 10,706,867 | B1* | 7/2020 | Villavicencio | G10L 21/013 |
| 11,410,667 | B2* | 8/2022 | Chakravarty | G10L 19/00 |
| 2007/0208566 | A1* | 9/2007 | En-Najjary | G10L 21/00 704/E21.001 |
| 2008/0082333 | A1* | 4/2008 | Nurminen | G10L 21/00 704/250 |
| 2008/0201150 | A1* | 8/2008 | Tamura | G10L 21/00 704/E21.001 |
| 2018/0342256 | A1* | 11/2018 | Huffman | G10L 21/013 |
| 2018/0342258 | A1* | 11/2018 | Huffman | G10L 15/02 |
| 2019/0122651 | A1* | 4/2019 | Arik | G10L 13/08 |
| 2019/0180732 | A1* | 6/2019 | Ping | G06F 9/30003 |
| 2019/0304480 | A1* | 10/2019 | Narayanan | G10L 13/02 |
| 2019/0385628 | A1* | 12/2019 | Nakashika | G10L 17/04 |
| 2020/0365166 | A1* | 11/2020 | Zhang | G10L 21/013 |
| 2020/0395028 | A1* | 12/2020 | Kameoka | G06N 3/044 |
| 2020/0410976 | A1* | 12/2020 | Zhou | G06N 3/048 |
| 2021/0020161 | A1* | 1/2021 | Gao | G10L 13/08 |
| 2021/0201890 | A1* | 7/2021 | Wang | G10L 15/30 |
| 2022/0335944 | A1* | 10/2022 | Kameoka | G10L 21/007 |

OTHER PUBLICATIONS

Tobing et al, "An evaluation of deep spectral mappings and wavenet vocoder for voice conversion", Dec. 2018, In2018 IEEE Spoken Language Technology Workshop (SLT) Dec. 18, 2018 (pp. 297-303). IEEE. (Year: 2018).*

Tobing et al, "Voice conversion with CycleRNN-based spectral mapping and finely tuned WaveNet vocoder", Nov. 2019, IEEE Access. Nov. 26, 2019;7:171114-25. (Year: 2019).*

Lorenzo-Trueba et al, "The voice conversion challenge 2018: Promoting development of parallel and nonparallel methods", Apr. 2018, arXiv preprint arXiv:1804.04262. Apr. 12, 2018. (Year: 2018).*

ISR for PCT/CN2019/127948.
Written opinions of ISA for PCT/CN2019/127948.

* cited by examiner

METHOD AND APPARATUS FOR VOICE CONVERSION AND STORAGE MEDIUM

TRAVERSE REFERENCE TO RELATED PRESENT DISCLOSURE PROGRAMS

The present application is a continuation-application of International Application PCT/CN2019/127948, with an international filing date of Dec. 24, 2019, the contents of all of which are hereby incorporated by reference.

BACKGROUND

1. Technical Field

The present disclosure relates to speech recognition technology, and particularly to a method and an apparatus for voice conversion as well as a storage medium.

2. Description of Related Art

At present, the most cutting-edge voice conversion technologies are all based on deep learning technology, which have good conversion effect and high voice similarity, and can be smooth and natural. The deep learning-based voice conversion technologies can be divided into different types according to the structure of the neural network used. For example, the voice conversion technology using Bi-LSTM, the voice conversion technology using the Seq2Seq2 model, and the voice conversion technology using WGAN.

At present, all the Bi-LSTM models perform one-to-one conversions, that is, converting from a specific source speaker A to a specific target speaker B, which will cause some troubles in use, for example, if there are a plurality of target speaks, it is necessary to train a plurality of one-to-one models. As a result, it will be impossible to realize many-to-many voice conversion with a single voice model in industrial production application, and has extra cost for the storage of the models.

BRIEF DESCRIPTION OF THE DRAWINGS

To describe the technical schemes in the embodiments of the present disclosure or in the prior art more clearly, the following briefly introduces the drawings required for describing the embodiments or the prior art. It should be understood that, the drawings in the following description merely show some embodiments of the present disclosure. For those skilled in the art, other drawings can be obtained according to the drawings without creative efforts.

In which.

DETAILED DESCRIPTION

The technical solutions in the embodiments of the present disclosure will be clearly and completely described below with reference to the drawings. Apparently, the described embodiments are part of the embodiments of the present disclosure, not all of the embodiments. Based on the embodiments of the present disclosure, all other embodiments obtained by those of ordinary skill in the art without creative work will fall within the protection scope of the present disclosure.

Figure 1:
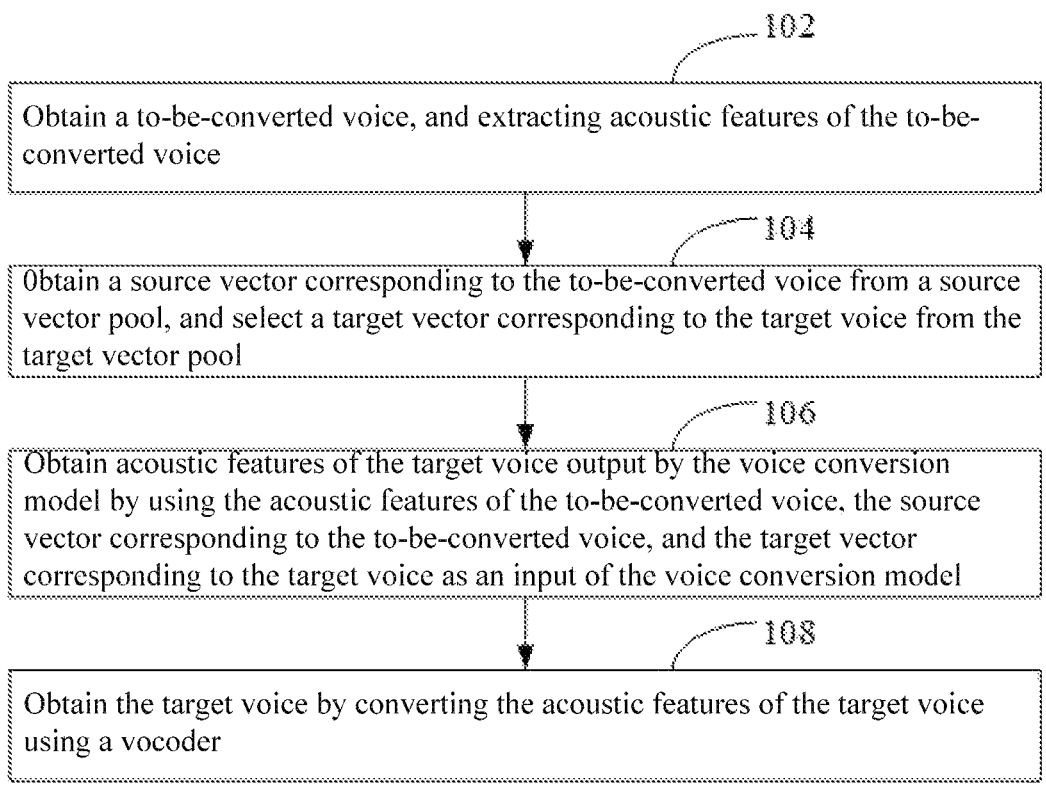
FIG. 1 is a flow chart of a voice conversion method according to an embodiment of the present disclosure.

As shown in FIG. 1, a voice conversion method is proposed. The voice conversion method can be applied to a terminal. In this embodiment, as an example, the method is applied to a terminal. The voice conversion method specifically includes the following steps.

Step 102: obtaining a to-be-converted voice, and extracting acoustic features of the to-be-converted voice.

In which, the to-be-converted voice refers to voice signals that need to be converted, and the acoustic features of the to-be-converted voice refer to acoustic parameters corresponding to the voice signals to be converted. The acoustic parameters corresponding to the voice signals to be converted can include: frequency spectrum, fundamental frequency, non-periodic frequency, Mel-frequency cepstrum, unvoiced/voiced information, and the like. Since different voice signals correspond to different acoustic features, it is necessary to extract the acoustic features of the to-be-converted voice. In one embodiment, the to-be-converted voice can be converted into the corresponding acoustic features based on a voice feature analyzer. For example, the to-be-converted voice can be converted into corresponding acoustic features such as frequency spectrum, fundamental spectrum, and non-periodic frequency via the voice feature analyzer. Since the Mel-frequency cepstrum and unvoiced/voiced information can better reflect the characteristics of the human ear, the obtained frequency spectrum can be converted into the Mel-frequency cepstrum, the logarithm of the obtained base spectrum can be calculated, and the unvoiced/voiced information can be calculated according to the obtained acoustic features, and then the obtained Mel-frequency cepstrum, the logarithm of the base spectrum, and unvoiced/voiced information can be used as the acoustic features of the to-be-converted voice, thereby extracting the above-mentioned acoustic features.

Step 104: obtaining a source vector corresponding to the to-be-converted voice from a source vector pool, and selecting a target vector corresponding to the target voice from the target vector pool.

In which, the source vector pool refers to a vector pool corresponding to voices of a plurality of source speakers that is obtained through training. The source vector pool can include vectors corresponding to the voices of the plurality of source speakers. In which, the voices of the plurality of source speakers refer to audios of the plurality of source speakers that need to be trained, and the voices of the plurality of source speakers can be obtained based on sampling. The source vector is a vector corresponding to one of the plurality of source speakers which represents his timbre characteristics. The target vector pool refers to a vector pool corresponding to voices of a plurality of target speakers that is obtained through training. The target vector pool can include vectors corresponding to voices of a plurality of target speakers. In which, the voices of the plurality of target speakers refer to audios of the plurality of target speakers that need to be trained. The voice of the plurality of target speakers can be obtained based on sampling. The target vector refers to a vector corresponding to one of the plurality of the target speakers which represents his timbre characteristics. The target voice refers to an output voice obtained after converting the to-be-converted voice, which can be selected from collected voices of a plurality of real target speaker. Since the source vector pool and the target vector pool include the vectors corresponding to the voices of the plurality of source speakers and the vectors corresponding to the voices of the plurality of target speakers, and what needs to be obtained is the source vector corresponding to the to-be-converted voice and the target vector corresponding to the target voice, it is necessary to extract the source vector and the target vector from the source vector pool and the target vector pool, respectively. Furthermore, because the to-be-converted voice is a determined voice, the source vector can be directly extracted from the source vector pool according to the to-be-converted voice. The target voice can be obtained according to the selection of the user, where the user can select to obtain one or more target voices. Therefore, the target vector can be selected from the target vector pool according to the target voice selected by the user.

In one embodiment, the source vector can be extracted from the vectors corresponding to the voices of the plurality of source speakers included in the source vector pool according to an identifier corresponding to the to-be-converted voice, and then select the target vector corresponding to the target voice from the vectors corresponding to the voices of the plurality of target speakers in the target vector pool based on identifiers corresponding to the target voices selected by the user. The obtained source vector and target vectors can be used for conversion to obtain the acoustic features of the target voice.

Step 106: obtaining acoustic features of the target voice output by the voice conversion model by using the acoustic features of the to-be-converted voice, the source vector corresponding to the to-be-converted voice, and the target vector corresponding to the target voice as an input of the voice conversion model.

In which, the voice conversion model refers to a training model obtained by training based on a plurality of voice data, and the acoustic features of the target voice refer to the acoustic parameters corresponding to the target voice, where the acoustic features of the target voice include: fundamental frequency, non-periodic frequency, Mel-frequency cepstrum, and the like. In one embodiment, the voice conversion model can be obtained by training based on the acoustic features of the voices of the plurality of source speakers, the acoustic features corresponding to the voices of the plurality of target speakers, the vectors corresponding to the voices of the plurality of source speakers, and the vectors corresponding to the voices of the plurality of target speakers, and then the acoustic features of the target voice can be obtained by using the acoustic features of the to-be-converted voice, the source vector corresponding to the to-be-converted voice, and the target vector corresponding to the target voice as the input of the voice conversion model and obtaining the output of the voice conversion model.

Step 108: obtaining the target voice by converting the acoustic features of the target voice using a vocoder.

In which, the vocoder refers to a voice synthesis system corresponding to the voice conversion model, and the vocoder can synthesize voice waveforms based on the received acoustic features. In one embodiment, the vocoder can be a voice synthesis system that is obtained by training and can synthesize a plurality of target voices, respectively. The vocoder obtained by training can synthesize the target voice according to the target vector and the acoustic features of the target voice corresponding to different target voices. For example, the target voice can be obtained by using the target vector and the acoustic features of the target voice corresponding to the target voice as the input of the trained vocoder and then obtaining the output of the trained vocoder.

In the above-mentioned voice conversion method, the acoustic features of the target voice are obtained through the voice conversion model, and then the acoustic features of the target voice are converted to obtain the target voice, so that a single voice conversion model can perform many-to-many voice conversion, while the issue of extra cost for the storage of the models can be solved.

Figure 2:
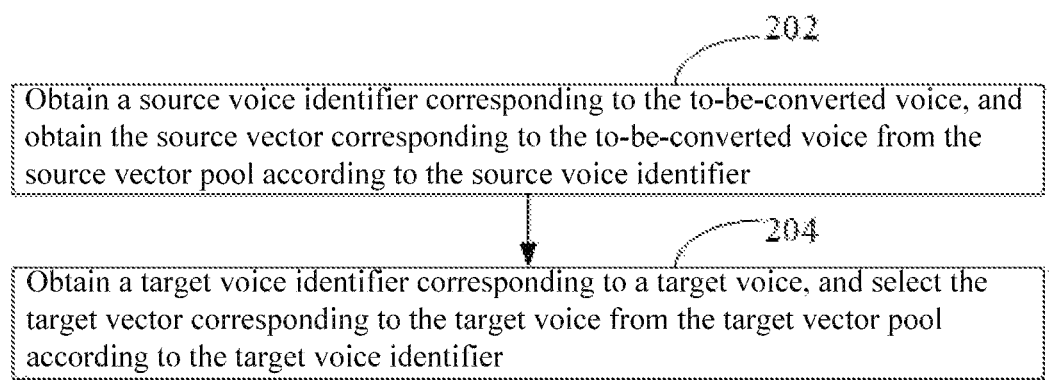
FIG. 2 is a flow chart of obtaining a source vector and obtaining a target direction according to an embodiment of the present disclosure.

As shown in FIG. 2, in one embodiment, the step of obtaining the source vector corresponding to the to-be-converted voice from the source vector pool, and selecting the target vector corresponding to the target voice from the target vector pool includes the following steps.

Step 202: obtaining a source voice identifier corresponding to the to-be-converted voice, and obtaining the source vector corresponding to the to-be-converted voice from the source vector pool according to the source voice identifier.

In which, the source voice identifier refers to the identifier of the source speaker corresponding to the to-be-converted voice. Since the to-be-converted voice can be selected from the voices of the plurality of source speakers, that is, the to-be-converted voice can be the voices of one or more source speaker among the voices of the plurality of source speakers. In addition, because the source vector pool can include the vectors corresponding to the voices of the plurality of source speakers, and the voices corresponding to different source speakers correspond to different vectors, in order to obtain the vector corresponding to the voice of the source speaker corresponding to the to-be-converted voice, the vector corresponding to the to-be-converted voice can be searched from the source vector pool according to the source voice identifier corresponding to the to-be-converted voice, so as to obtain the source vector corresponding to the to-be-converted voice. In one embodiment, assuming that the source voice identifier corresponding to the to-be-converted voice is src_speaker_id, the corresponding vector can be searched from the source vector pool according to the source voice identifier src_speaker_id to obtain the corresponding vector of src_speaker_embedding, so as to obtain the source vector src_speaker_embedding corresponding to-be-converted voice.

Step 204: obtaining a target voice identifier corresponding to a target voice, and selecting the target vector corresponding to the target voice from the target vector pool according to the target voice identifier.

In which, the target voice identifier refers to the identifier of the voice of the target speaker corresponding to the target voice. Since the target voices can be the voices of one or more target speakers that are selected from the voices of the plurality of the target speakers, the target vector pool can include the vectors corresponding to the voices of the plurality of target speakers, and the voices of different target speaker correspond to different vectors. In order to obtain the vector corresponding to the voice of the target speaker corresponding to the target voice, the vector corresponding to the target voice can be searched from the target vector pool according to the target voice identifier corresponding to the target voice, so as to obtain the target vector corresponding to the target voice. In one embodiment, assuming that the source voice identifier corresponding to the target voice is tgt_speaker_id, the corresponding vector can be searched from the target vector pool according to the target voice identifier tgt_speaker_id to obtain the corresponding vector tgt_speaker_embedding, so as to obtain the target vector tgt_speaker_embedding corresponding to the target voice. By obtaining the source voice identifier corresponding to the to-be-converted voice, obtaining the target voice identifier corresponding to the target voice, and searching the corresponding vector based on the source voice identifier and the target voice identifier from the source vector pool and the target vector pool, respectively, so as to obtain the source vector corresponding to the to-be-converted voice and the target vector corresponding to the target vector, where the source vector can be accurately obtained from the plurality of vectors in the source vector pool and the target vector can be accurately selected from the plurality of vectors in the target vector pool.

Figure 3:
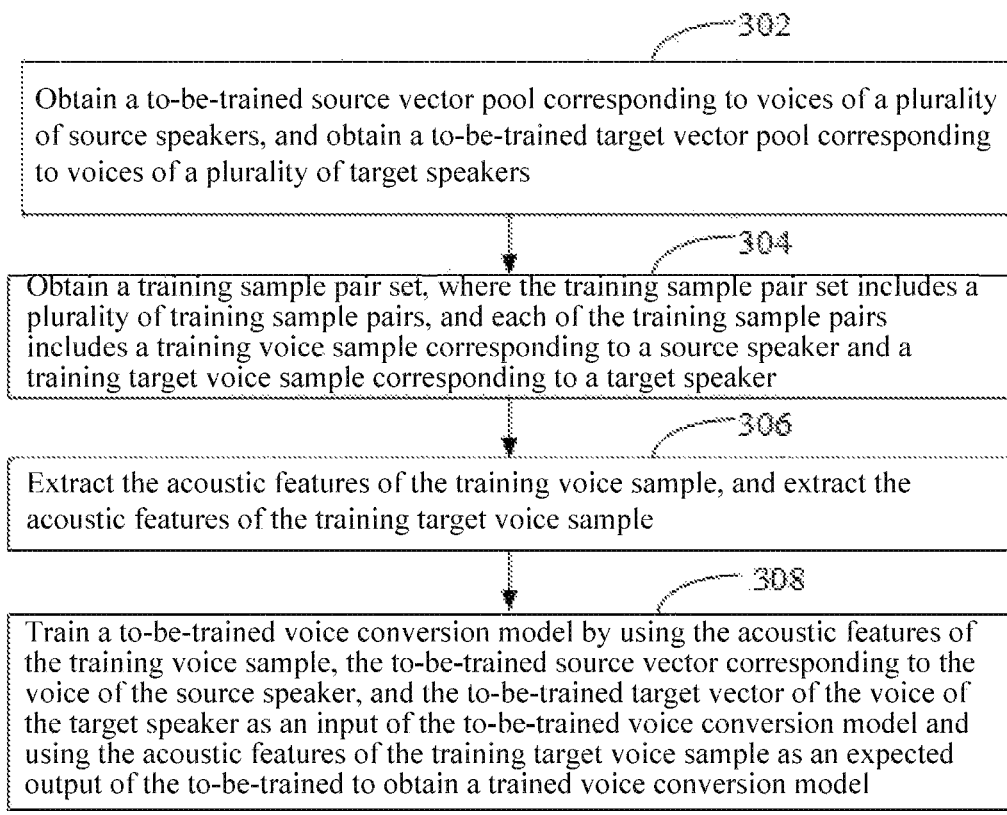
FIG. 3 is a flow chart of obtaining a voice conversion model by training according to an embodiment of the present disclosure.

As shown in FIG. 3, in one embodiment, the voice conversion model is obtained through the following steps.

Step 302: obtaining a to-be-trained source vector pool corresponding to voices of a plurality of source speakers, and obtaining a to-be-trained target vector pool corresponding to voices of a plurality of target speakers, where the to-be-trained source vector pool includes a to-be-trained source vector of the voice of each of the source speakers, and the to-be-trained target vector pool includes the to-be-trained target vector of the voice of each of the target speakers.

In which, the to-be-trained source vector pool refers to a vector pool composed of a plurality of to-be-trained source vectors corresponding to the voices of the plurality of source speakers that need to be trained; the to-be-trained source vector refers to the vector corresponding to the voices of the plurality of source speakers that needs to be trained; the to-be-trained target vector pool refers to a vector pool composed of the plurality of target vectors to be trained corresponding to the voices of the plurality of target speakers that need to be trained; and the to-be-trained target vector refers to the vector corresponding to the voices of the plurality of target speakers that need to be trained. It can collect the voices of the plurality of source speakers and the voices of the plurality of target speakers at the same time, and then obtain the to-be-trained source vector pool corresponding to the voices of the plurality of source speakers and the to-be-trained target vector pool corresponding to the voices of the plurality of target speakers. In one embodiment, the to-be-trained source vector pool can include the to-be-trained source vector corresponding to the voices of M source speakers, for example, it can include the to-be-trained source vectors corresponding to the voices of 10 source speakers, and the above-mentioned to-be-trained source vector pool can be obtained by assuming that the dimensionality of the to-be-trained source vector pool corresponding to the voices of the 10 source speakers is 10*16. Assuming that the to-be-trained target vector pool can include the to-be-trained target vector corresponding to the voices of M target speakers, for example, it can include the to-be-trained target vector corresponding to the voices of 10 target speakers, and the above-mentioned to-be-trained target vector pool can be obtained by assuming that the dimension of the to-be-trained target vector pool corresponding to the voices of the 10 target speakers is 10*16.

Step 304: obtaining a training sample pair set, where the training sample pair set includes a plurality of training sample pairs, and each of the training sample pairs includes a training voice sample corresponding to a source speaker and a training target voice sample corresponding to a target speaker.

In which, the training sample pairs refers to a plurality of pairs of training samples composed of the training voice sample corresponding to each source speaker and the training target voice sample corresponding to each target speaker. In which, the training voice sample corresponding to the source speaker can include the acoustic features of the voice of each source speaker and the to-be-trained source vector corresponding to the voice of each source speaker; the training target voice sample corresponding to the target speaker can include the acoustic features of the voice of each target speaker and the to-be-trained target vector corresponding to the voice of the target speaker; and the training sample pair set refers to a set composed of the plurality of pairs of training samples It can train each of the training sample pairs in the training sample pair set together with the parameters in the voice conversion model, so that the to-be-trained source vector corresponding to the voice of each source speaker of the training voice sample in each training sample pair and the to-be-trained target vector corresponding to the voice of each target speaker corresponding to the training target voice sample are updated together with the parameters in the voice training model.

In one embodiment, to obtain the training sample pair set, it can first obtain the training voice sample corresponding to each source speaker and the training target voice sample corresponding to each target speaker, compose each training sample pair, and then combine the training sample pairs to obtain the training sample pair set. In which, he training voice sample can be obtained by obtaining the acoustic features corresponding to the voice of each source speaker and the to-be-trained source vector; and the training target voice sample can be obtained by obtaining the acoustic features and the to-be-trained target vector corresponding to the voice of each target speaker. Then, each of the plurality of training sample pairs composed of each training voice sample and each training target voice sample can be obtained in turn so as to combine the two and obtain the plurality of training sample pairs, thereby obtaining the training sample pair set. For example, assuming that there are 5 training voice samples and 5 training target voice samples, it can obtain only the first training voice sample and the first training target voice sample at a time to combine the two to form the first training sample pair so as to combine the 5 training voice samples and the 5 training target voice samples in turn to obtain the combined 25 training sample pairs, and then finally a training sample pair set consisting of 25 training sample pairs can be obtained. The obtained training sample pair set can be used for the training of the voice conversion model.

Step 306: extracting the acoustic features of the training voice sample, and extracting the acoustic features of the training target voice sample.

In which, the acoustic features of the training voice samples refer to acoustic parameters corresponding to the voice of each source speaker, where the above-mentioned acoustic parameters can include frequency spectrum, fundamental frequency, non-periodic frequency, Mel-frequency cepstrum, and the like. The acoustic features of the training target voice sample refer to the acoustic parameters corresponding to the voice of each target speaker, where the above-mentioned acoustic parameters can include frequency spectrum, fundamental frequency, non-periodic frequency, Mel-frequency cepstrum, and the like. Since different training voice samples correspond to the acoustic features corresponding to the voices of different source speakers, and different training target voice samples correspond to the acoustic features corresponding to the voices of different target speakers, the acoustic features of each training voice sample and the acoustic features of each training target voice sample can be extracted separately. In one embodiment, it can extract the Mel-frequency cepstrum and unvoiced/voiced information of the training voice sample, and extract the Mel-frequency cepstrum and unvoiced/voiced information of the training target voice sample may, so as to obtain the acoustic features of the training voice sample and the acoustic features of the training target voice sample, respectively.

Step 308: training a to-be-trained voice conversion model by using the acoustic features of the training voice sample, the to-be-trained source vector corresponding to the voice of the source speaker, and the to-be-trained target vector of the voice of the target speaker as an input of the to-be-trained voice conversion model and using the acoustic features of the training target voice sample as an expected output of the to-be-trained to obtain a trained voice conversion model.

In which, the to-be-trained voice conversion model refers to a voice conversion model that needs to be trained, and the trained voice conversion model refers to a voice conversion model obtained by training based on each voice data. In one embodiment, it can train the to-be-trained voice conversion model to obtain the trained voice conversion model. It can use the acoustic features of the training voice sample, the to-be-trained source vector corresponding to the voice of the source speaker, and the to-be-trained target vector of the voice of the target speaker as the input of the to-be-trained voice conversion model, and use the acoustic features of the training target voice sample as the expected output, so as to train the to-be-trained voice conversion model, thereby obtaining the trained voice conversion model. For example, in the case of training a training sample pair at time t, the acoustic features of the training voice sample is $x_t$, if the to-be-trained source vector is src_speaker_embedding, the to-be-trained target vector is tgt_speaker_embedding, and the output of the obtained to-be-trained conversion model is $\hat{y}_t$, then the output $\hat{y}_t$ can be calculated by the following formula:

$$\hat{y}_t = f_{bilstm}(\text{concat}(x_t, \text{src\_speaker\_embedding}, \text{tgt\_speaker\_embedding})).$$

The output $\hat{y}$ of the to-be-trained voice conversion model can be calculated based on the above-mentioned formula. Then, the to-be-trained voice conversion model can be trained based on the obtained output $\hat{y}$ to obtain the expected output (that is, to obtain the acoustic features of the training target voice sample), so as to obtain the trained voice conversion model. By obtaining the to-be-trained source vector pool and the to-be-trained target vector pool, and obtaining the training sample pair set, and then extracting the acoustic features of the training voice samples and the acoustic features of the training target voice samples, and finally using the acoustic features of the training voice samples, the to-be-trained source vector corresponding to the voice of the source speaker, and the to-be-trained target vector of the voice of the target speaker as the input of the to-be-trained voice conversion model and using the acoustic features of the training target voice sample as the expected output, the to-be-trained voice conversion model is trained to obtain the trained voice conversion model. Through the entire training process, the to-be-trained source vector in the to-be-trained source vector pool, the to-be-trained target vector in the to-be-trained target vector pool, and the parameters in the to-be-trained voice conversion model are simultaneously updated and learned. It can be realized that after the training is converged, a trained source vector represents the acoustic features of the voice of the source speaker corresponding to the vector, and a trained target vector represents the acoustic features of the voice of the target speaker corresponding to the vector, so that the trained voice conversion model can be used to convert the to-be-converted voice into the target voice. In such a manner, a single voice conversion model can perform many-to-many voice conversions, thereby solving the issue of extra cost for the storage of the models.

Figure 4:
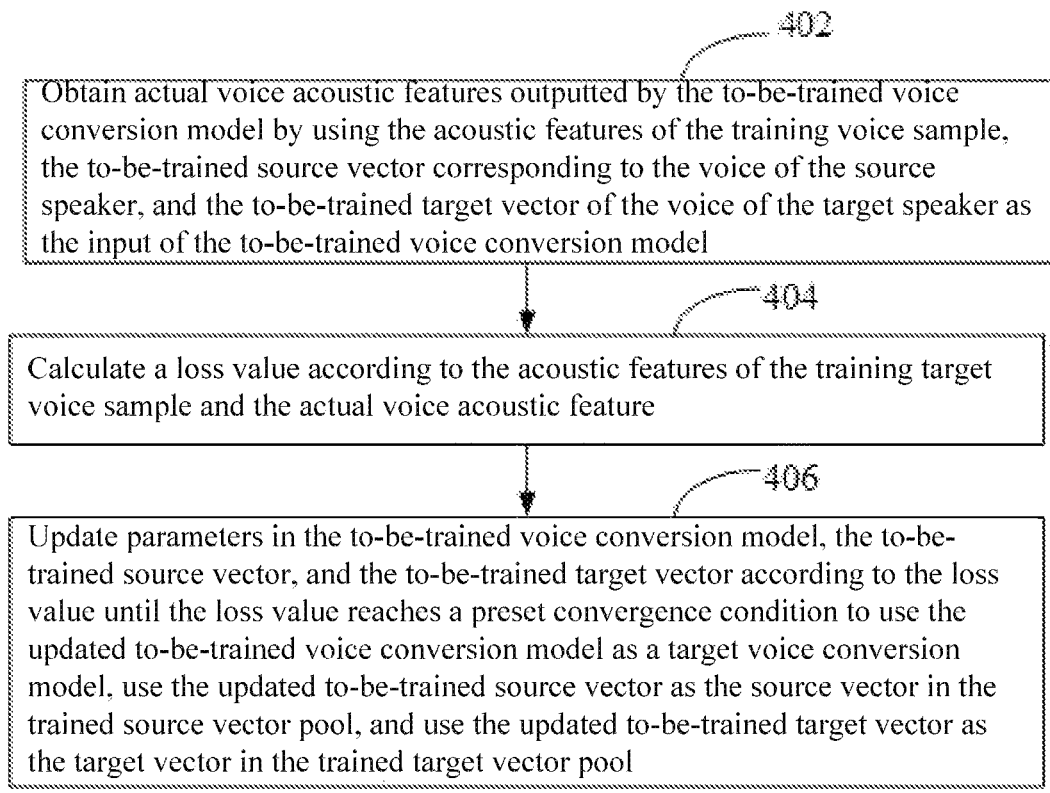
FIG. 4 is a flow chart of training a to-be-trained voice conversion model according to an embodiment of the present disclosure.

As shown in FIG. 4, in one embodiment, the step of training the to-be-trained voice conversion model by using the acoustic features of the training voice sample, the to-be-trained source vector corresponding to the voice of the source speaker, and the to-be-trained target vector of the voice of the target speaker as the input of the to-be-trained voice conversion model and using the acoustic features of the training target voice sample as the expected output of the to-be-trained to obtain the trained voice conversion model includes the following steps.

Step 402: obtaining actual voice acoustic features outputted by the to-be-trained voice conversion model by using the acoustic features of the training voice sample, the to-be-trained source vector corresponding to the voice of the source speaker, and the to-be-trained target vector of the voice of the target speaker as the input of the to-be-trained voice conversion model.

In which, the actual voice acoustic features refer to the actual acoustic features output by the to-be-trained voice conversion model. Since the acoustic features output by the to-be-trained voice conversion model are not necessarily the expected acoustic features or are quite different from the expected acoustic features, it is necessary to obtain the actual acoustic features output by the to-be-trained voice conversion model. In one embodiment, it can use the acoustic features of the training voice sample, the to-be-trained source vector corresponding to the voice of the source speaker, and the to-be-trained target vector of the voice of the target speaker as the input of the to-be-trained voice conversion model to obtain the output of the to-be-trained voice conversion model. The output can be used as the actual voice acoustic features, thereby obtaining the actual voice acoustic features. The actual voice acoustic features can be used to train the to-be-trained voice conversion model.

Step 404: calculating a loss value according to the acoustic features of the training target voice sample and the actual voice acoustic feature.

In which, the loss value refers to a numerical value representing the difference between the actual voice acoustic features the and the acoustic features of the training target voice sample. Since the actual voice acoustic features obtained in the training phase will be quite different from the expected acoustic features, in order to obtain the difference between the two, it can calculate the loss value based on the acoustic features of the training target voice sample and the actual voice acoustic features, so that the loss value can be used to express the difference between the two. In one embodiment, assuming that the actual voice acoustic features are ŷ (T×N, where N can be 130 herein), if the acoustic features of the training target voice sample is y, and the loss value is loss, and the loss value can be calculated based on ŷ and y through the following formula:

$$\text{loss} = \frac{1}{\text{batch}} * \sum_{\text{batch}} (\hat{y} - y)^2.$$

According to the above-mentioned formula, the loss value loss can be calculated, that is, the difference between the acoustic features of the training target voice sample and the actual voice acoustic features can be obtained. The loss value loss can be used to update the parameters in the to-be-trained voice conversion model, the to-be-trained source vector, and the to-be-trained target vector.

Step 406: updating parameters in the to-be-trained voice conversion model, the to-be-trained source vector, and the to-be-trained target vector according to the loss value until the loss value reaches a preset convergence condition to use the updated to-be-trained voice conversion model as a target voice conversion model, using the updated to-be-trained source vector as the source vector in the trained source vector pool, and using the updated to-be-trained target vector as the target vector in the trained target vector pool.

In which, the parameters in the to-be-trained voice conversion model can include a parameter matrix W, the preset convergence condition refers to a preset condition of the convergence of the training, and the target voice conversion model refers to a voice conversion model for converting the to-be-converted voice into the target voice. Since there is a difference between the actual voice acoustic parameters and the acoustic features of the training target voice sample, in order to obtain the acoustic features of the training target voice sample, it can update the parameters in the to-be-trained voice conversion model, the to-be-trained source vector, and the to-be-trained target vector based on the loss value until the preset convergence condition is met, so that the training is converged, and eventually the updated parameters can be obtained.

In one embodiment, assuming that the calculated loss value is loss, the gradient descent can be performed based on the calculated loss value loss to update the parameters in the to-be-trained model, the to-be-trained source vector, and the to-be-trained target vector. The preset convergence condition can be that the training is converged (i.e., the updating of the parameters in the to-be-trained model, the to-be-trained source vector and the to-be-trained target vector is ended) in the case that the actual voice acoustics features are equal to the acoustic features of the training target voice sample. The to-be-trained voice conversion model obtained in the last updating can be used as the target voice conversion model. Since each to-be-trained source vector and each to-be-trained target vector have been updated after the training has converged, the last updated to-be-trained source vector can be used as the source vector in the trained source vector pool, and the last updated to-be-trained target vector can be used as the target vector in the trained target vector pool. By obtaining the actual voice acoustic features, calculating the loss value based on the acoustic features of the training target voice sample and the actual voice acoustic features, then updating the parameters in the to-be-trained voice conversion model, the to-be-trained source vector, and the to-be-trained target vector based on the obtained loss value, and then using the last updated to-be-trained voice conversion model as the target voice conversion model, using the last updated to-be-trained source vector as the source vector in the trained source vector pool, and using the last updated to-be-trained target vector as the target vector in the trained target vector pool, it can enable the to-be-trained source vector, the to-be-trained target vector, and the parameters in the to-be-trained voice conversion model to be updated and learned at the same time. Through the preset convergence condition, the training can be converged according to actual needs. It realize that after the training is converged, a certain vector in the source vector pool and the target vector pool represents the acoustic features of the voice of the speaker, so that the trained target voice conversion model can perform many-to-many voice conversions, thereby solving the issue of extra cost for the storage of the models.

Figure 5:
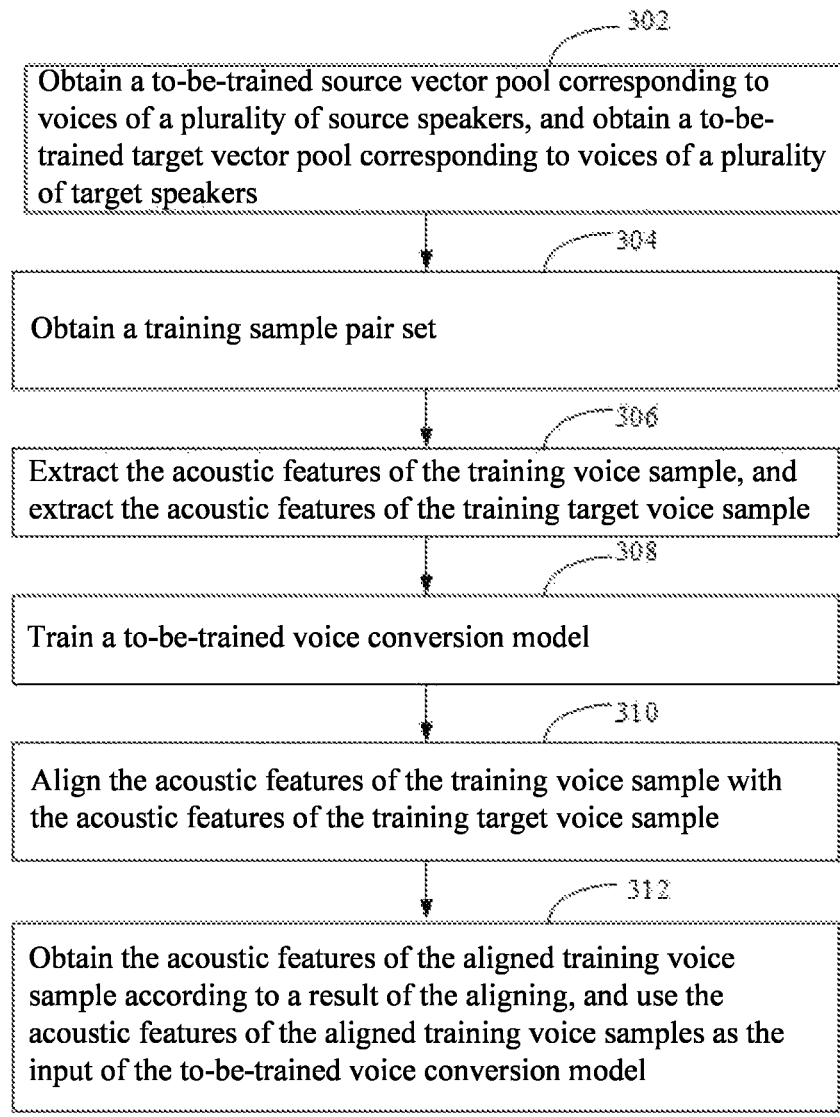
FIG. 5 is a flow chart of aligning the acoustic features of the training voice sample with the acoustic features of the training target voice sample according to an embodiment of the present disclosure.

As shown in FIG. 5, in one embodiment, after the step of extracting the acoustic features of the training voice sample, and extracting the acoustic features of the training target voice sample, the method further includes:

Step 310: aligning the acoustic features of the training voice sample with the acoustic features of the training target voice sample.

In which, the aligning refers to aligning the acoustic features of the training voice sample with the acoustic features of the training target voice sample. Since the acoustic features of the training voice samples are quite random, if the acoustic features of the training voice samples are directly matched with the acoustic features of the training target voice samples, the acoustic features of the training voice samples will not be able to match the acoustic features of the training target voice samples, which results in the two cannot match. Therefore, it is necessary to align the acoustic features of the training voice sample with the acoustic features of the training target voice sample, so that the acoustic features of the training voice sample and the acoustic features of the training target voice sample can be aligned one by one. In one embodiment, the dynamic time warping (DTW) method can be used to align the acoustic features of the training voice sample with the acoustic features of the training target voice sample, that is, the acoustic features of the training voice sample are distorted or bended unevenly so as to align with the acoustic features of the training target voice sample.

Step 312: obtaining the acoustic features of the aligned training voice sample according to a result of the aligning, and using the acoustic features of the aligned training voice samples as the input of the to-be-trained voice conversion model.

In which, the alignment result refers to the acoustic features of the training voice sample after the acoustic features of the training voice sample and the acoustic features of the training target voice sample are aligned one by one. Since the acoustic features of the training voice samples are aligned with the acoustic features of the training target voice samples, the acoustic features of the aligned training voice samples can be obtained, and then the acoustic features of the aligned training voice samples can be used as the input of the to-be-trained voice conversion model. In one embodiment, assuming that the acoustic features of the aligned training voice samples are x (T×N, where N can be 130 herein), where T is the number of frames of the acoustic features of the training voice samples after Fourier transform. In which, N=130 is a collection of Mel-frequency cepstrum+first-order/second-order reciprocal, $lf_0$+first-order/second-order reciprocal, unvoiced/voiced, and ap+first-order/second-order reciprocal. The acoustic features of the aligned training voice samples x can be used as the input of the to-be-trained voice conversion model. By aligning the acoustic features of the training voice sample with the acoustic features of the training target voice sample, the matching issue that the lengths of the acoustic features of the training voice sample and the acoustic features of the training target voice sample are different can be solved. By using the acoustic features of the aligned training voice samples x as the input of the to-be-trained voice conversion model, the recognition accuracy of the system for the acoustic features of the training voice samples can be effectively improved.

Figure 6:
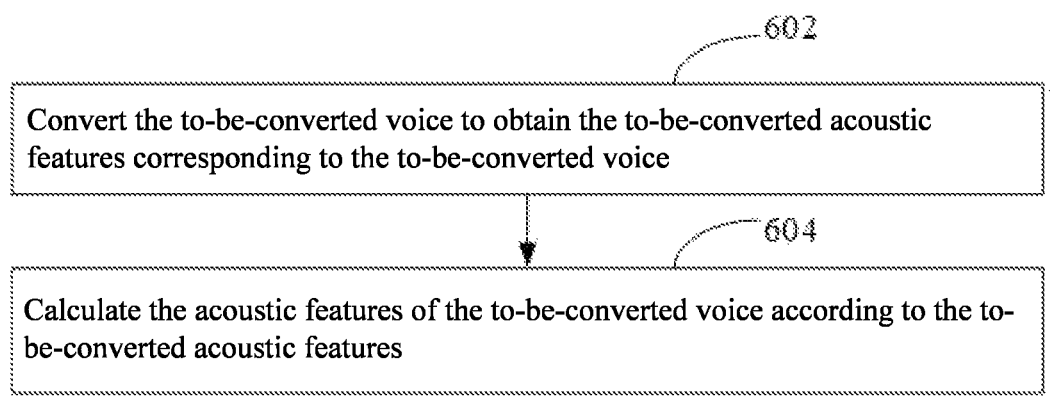
FIG. 6 is a flow chart of extracting the acoustic features of the to-be-trained voice according to an embodiment of the present disclosure.

As shown in FIG. 6, in one embodiment, the step of obtaining the to-be-converted voice, and extracting the acoustic features of the to-be-converted voice includes:

Step 602: converting the to-be-converted voice to obtain the to-be-converted acoustic features corresponding to the to-be-converted voice.

In which, the to-be-converted acoustic features refer to acoustic parameters obtained by using a voice feature analyzer to convert the to-be-converted voice. The to-be-converted acoustic features can include frequency spectrum, fundamental frequency, non-periodic frequency, and the like. Since the to-be-converted voice can include various information, for example, voice content information, acoustic feature information and speaking environment information of the voice of the source speaker, where only the acoustic feature information of the voice of the source speaker describes the sound features related to the identity of the source speaker, so the to-be-converted acoustic features corresponding to the to-be-converted voice need to be extracted, and the to-be-converted acoustic features are converted while other information can be kept unchanged. In one embodiment, a WORLD voice feature analyzer can be used to convert the to-be-converted voice to obtain the to-be-converted acoustic features corresponding to the to-be-converted voice. For example, it can use the WORLD voice feature analyzer to convert the to-be-converted voice into frequency spectrum, fundamental frequency and non-periodic frequency, and these three acoustic features can be used as the to-be-converted acoustic features. The to-be-converted acoustic features can be used to obtain the acoustic features of the to-be-converted voice.

Step 604: calculating the acoustic features of the to-be-converted voice according to the to-be-converted acoustic features.

In one embodiment, it can obtain the to-be-converted acoustic features such as frequency spectrum, fundamental frequency, and non-periodic frequency by converting based on the voice feature analyzer. Since Mel-frequency cepstrum and unvoiced/voiced sounds can better reflect the characteristics of the human ear, the Mel-frequency cepstrum, the fundamental frequency logarithm and the unvoiced/voiced information can be calculated based on the frequency spectrum, fundamental frequency and non-periodic frequency, and the obtained Mel-frequency cepstrum, fundamental frequency logarithm, and unvoiced/voiced information can be used as the acoustic features of the to-be-converted voice. For example, the Mel-frequency cepstrum can be calculated based on the frequency spectrum, and the logarithm of the fundamental frequency can be calculated to obtain the fundamental frequency logarithm $lf_0$, and then the unvoiced/voiced information can be calculated based on the to-be-converted acoustic features. It uses the voice feature analyzer to convert the to-be-converted voice, and extracts the to-be-converted acoustic features, and then the acoustic features of the to-be-converted voice can be calculated according to the to-be-converted acoustic features. By re-converting the to-be-converted acoustic features, the acoustic features of the to-be-converted voice that can better reflect the characteristics of the human ear can be obtained, so that the efficiency and quality of the voice conversion can be improved.

Figure 7:
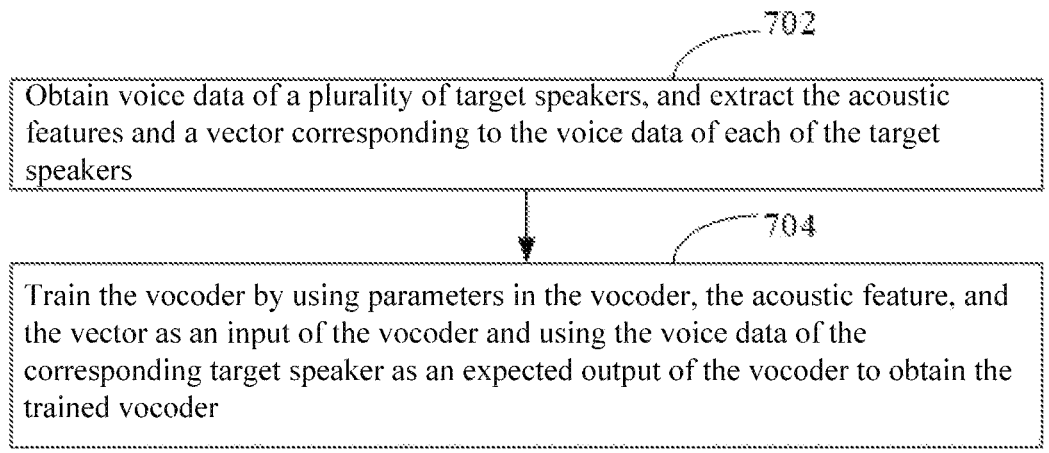
FIG. 7 is a flow chart of obtaining a vocoder by training according to an embodiment of the present disclosure.

As shown in FIG. 7, in one embodiment, the vocoder is obtained through the following steps.

Step 702: obtaining voice data of a plurality of target speakers, and extracting the acoustic features and a vector corresponding to the voice data of each of the target speakers.

In which, the voice data of the plurality of target speakers refers to related data of the voice of the plurality of target speakers, and the voice data of the plurality of target speakers can correspond to a plurality of acoustic features and a plurality of vectors. Since the voice data corresponding to different target speakers is different, the voice data of different target speakers needs to be obtained separately. The acoustic features and vector corresponding to the voice data of each target speaker can be extracted, so as to obtain the voice data of a plurality of target speakers that is more specific. In one embodiment, assuming that there are 5 target speakers namely 001, 002, 003, 004, and 005, respectively, the voice data of these 5 target speakers can be obtained, and then the acoustic features and vectors corresponding to the voice data of each target speaker can be extracted. For example, it can extract the spectrum, fundamental frequency and non-periodic frequency corresponding to the target speaker 001, and extract the target vector corresponding to the target speaker 001. The voice data of the plurality of target speakers as well as the acoustic features and vectors corresponding to the voice data of each target speaker can be used to train the vocoder.

Step 704: training the vocoder by using parameters in the vocoder, the acoustic feature, and the vector as an input of the vocoder and using the voice data of the corresponding target speaker as an expected output of the vocoder to obtain the trained vocoder, where the trained vocoder is for converting the acoustic features of the target voice to obtain the target voice.

In which, the trained vocoder refers to a vocoder for converting the acoustic features of the target voice into the target voice. It can convert the acoustic features of the plurality of target voices into the corresponding target voices based on the trained vocoder. In one embodiment, the vocoder can be trained by using the parameters of the vocoder as well as the acoustic features and the vectors of the plurality of target speakers as the input of the vocoder and using the voice data of the corresponding target speakers as the expected output, and then training the vocoder so as to obtain the trained vocoder. For example, the parameters in the vocoder, the acoustic features of the plurality of target speakers and the corresponding vectors can be used as the input of the vocoder to obtain the actual target voice data output by the vocoder, that is, the actual voice data can be obtained. Then, the loss between the voice data of the target speaker and the actual voice data can be calculated based on the voice data of the target speaker and the actual voice data, and then optimization can be performed based on the obtained loss. After the voice data of the plurality of target speakers and the acoustic features and vectors corresponding to the voice data have all traversed, the trained vocoder can be obtained. After obtaining the trained vocoder, the trained vocoder can be used to convert the acoustic features of the target voice to obtain the target voice. The trained vocoder can be used to convert the acoustic features of the target voice to obtain the target voice. For example, it can use the vector of each target speaker as an information identity of the target speaker to assist the trained vocoder in identifying the acoustic features of the target speaker, and synthesize and convert the acoustic features through the trained vocoder to obtain the target voice. The vocoder is trained based on the voice data of the plurality of target speakers, and the acoustic features and vectors corresponding to the voice data, which makes the parameters in the vocoder to become stabilized through a large amount of training, so that outputting of a plurality of target voices through the vocoder can be realized.

Figure 8:
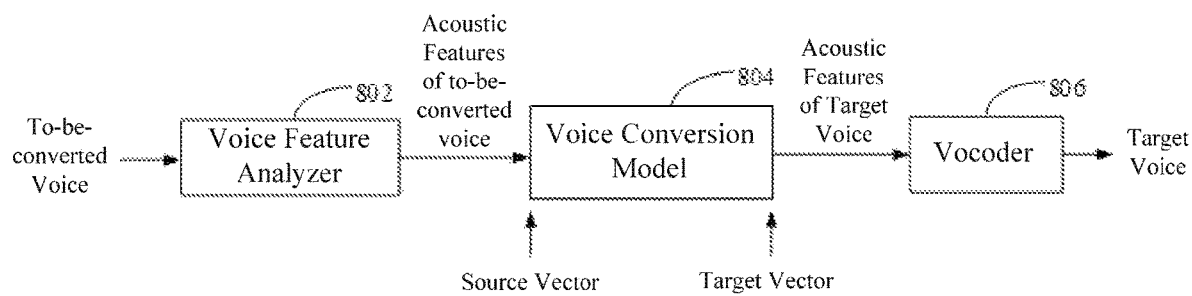
FIG. 8 is a block diagram of a voice conversion system according to an embodiment of the present disclosure.

As shown in FIG. 8, in this embodiment, a voice conversion system is provided. The system includes a voice feature analyzer 802, a voice conversion model 804, and a vocoder 806.

The voice feature analyzer 802 is configured to obtain a to-be-converted voice, and extracting acoustic features of the to-be-converted voice.

In one embodiment, the voice feature analyzer 802 can be a WORLD voice feature analyzer. It can extract the acoustic features of the to-be-converted voice through the WORLD voice feature analyzer. For example, it can use the WORLD voice feature analyzer to convert the to-be-converted voice into acoustic features such as frequency spectrum, fundamental frequency, and non-periodic frequency.

The voice conversion model 804 is configured to train the acoustic features of the to-be-converted voice, a source vector corresponding to the to-be-converted voice, and a target vector corresponding to a target voice and output acoustic features of the target voice.

In one embodiment, the voice conversion model 804 can be obtained by training based on the acoustic features of the voices of a plurality of source speakers, the acoustic features corresponding to the voices of a plurality of target speakers, vectors corresponding to the voices of the plurality of source speakers, and vectors corresponding to the voices of the plurality of target speakers. Then the acoustic features of the target voice can be obtained by using the acoustic features of the to-be-converted voice, the source vector corresponding to the to-be-converted voice and the target vector corresponding to the target voice as the input of the voice conversion model and then obtaining the output of the voice conversion model.

The vocoder 806 is configured to obtain the target voice by converting the acoustic features of the target voice.

In one embodiment, the vocoder 806 can be a WaveNet vocoder, and the acoustic features of the target voice can be synthesized into the target voice through the WaveNet vocoder.

Figure 9:
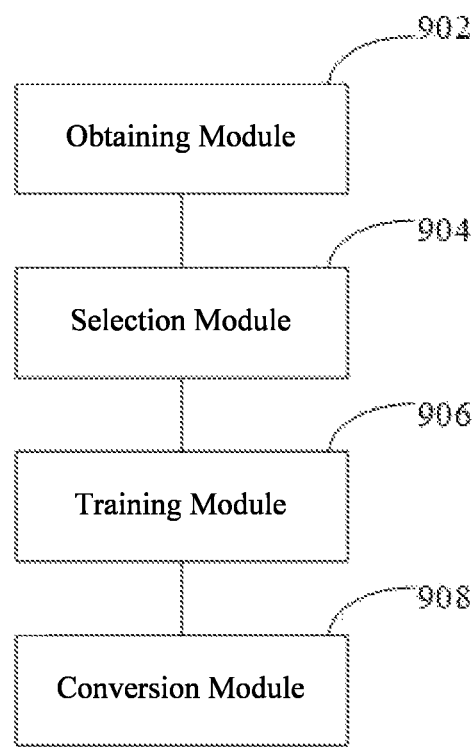
FIG. 9 is a block diagram of a voice conversion apparatus according to an embodiment of the present disclosure.

As shown in FIG. 9, in this embodiment, a voice conversion apparatus is provided. The apparatus includes:

an obtaining module 902 configured to obtain a to-be-converted voice, and extracting acoustic features of the to-be-converted voice;

a selection module 904 configured to obtain a source vector corresponding to the to-be-converted voice from a source vector pool, and selecting a target vector corresponding to the target voice from the target vector pool;

a training module 906 configured to obtain acoustic features of the target voice output by the voice conversion model by using the acoustic features of the to-be-converted voice, the source vector corresponding to the to-be-converted voice, and the target vector corresponding to the target voice as an input of the voice conversion model; and a conversion module 908 configured to obtain the target voice by converting the acoustic features of the target voice using a vocoder.

In one embodiment, the source vector corresponding to the to-be-converted voice is obtained from the source vector pool, and the target vector corresponding to the target voice is selected from the target vector pool by: further configuring the obtaining module 902 to obtain a source voice identifier corresponding to the to-be-converted voice, and obtain the source vector corresponding to the to-be-converted voice from the source vector pool according to the source voice identifier; and further configuring the obtaining module 902 to obtain a target voice identifier corresponding to a target voice, and select the target vector corresponding to the target voice from the target vector pool according to the target voice identifier.

In one embodiment, for obtaining the voice conversion model, the obtaining module 902 is further configured to obtain a to-be-trained source vector pool corresponding to voices of a plurality of source speakers, and obtain a to-be-trained target vector pool corresponding to voices of a plurality of target speakers, where the to-be-trained source vector pool includes a to-be-trained source vector of the voice of each of the source speakers, and the to-be-trained target vector pool includes the to-be-trained target vector of the voice of each of the target speakers; the obtaining module 902 is further configured to obtain a training sample pair set, where the training sample pair set includes a plurality of training sample pairs, and each of the training sample pairs includes a training voice sample corresponding to a source speaker and a training target voice sample corresponding to a target speaker; the selection module 904 is further configured to extract the acoustic features of the training voice sample, and extracting the acoustic features of the training target voice sample; and the training module 906 is further configured to train a to-be-trained voice conversion model by using the acoustic features of the training voice sample, the to-be-trained source vector corresponding to the voice of the source speaker, and the to-be-trained target vector of the voice of the target speaker as an input of the to-be-trained voice conversion model and using the acoustic features of the training target voice sample as an expected output of the to-be-trained to obtain a trained voice conversion model.

In one embodiment, the to-be-trained voice conversion model is trained by using the acoustic features of the training voice sample, the to-be-trained source vector corresponding to the voice of the source speaker, and the to-be-trained target vector of the voice of the target speaker as the input of the to-be-trained voice conversion model and using the acoustic features of the training target voice sample as the expected output of the to-be-trained to obtain the trained voice conversion model by: further configuring the obtaining module 902 to obtain actual voice acoustic features outputted by the to-be-trained voice conversion model by using the acoustic features of the training voice sample, the to-be-trained source vector corresponding to the voice of the source speaker, and the to-be-trained target vector of the voice of the target speaker as the input of the to-be-trained voice conversion model, and calculate a loss value according to the acoustic features of the training target voice sample and the actual voice acoustic feature; and further configuring the training module 906 to update parameters in the to-be-trained voice conversion model, the to-be-trained source vector, and the to-be-trained target vector according to the loss value until the loss value reaches a preset convergence condition to use the updated to-be-trained voice conversion model as a target voice conversion model, use the updated to-be-trained source vector as the source vector in the trained source vector pool, and use the updated to-be-trained target vector as the target vector in the trained target vector pool.

In one embodiment, after the acoustic features of the training voice sample are extracted, and the acoustic features of the training target voice sample are extracted by: aligning the acoustic features of the training voice sample with the acoustic features of the training target voice sample; and further configuring the training module 906 to obtain the acoustic features of the aligned training voice sample according to a result of the aligning, and use the acoustic features of the aligned training voice samples as the input of the to-be-trained voice conversion model.

In one embodiment, the to-be-converted voice is obtained, and the acoustic features of the to-be-converted voice are extracted by: further configuring the obtaining module 902 to convert the to-be-converted voice to obtain the to-be-converted acoustic features corresponding to the to-be-converted voice, and calculate the acoustic features of the to-be-converted voice according to the to-be-converted acoustic features.

In one embodiment, for obtaining the vocoder, the obtaining module 902 is further configured to obtain voice data of a plurality of target speakers, and extract the acoustic features and a vector corresponding to the voice data of each of the target speakers; and the training module 906 is further configured to train the vocoder by using parameters in the vocoder, the acoustic feature, and the vector as an input of the vocoder and using the voice data of the corresponding target speaker as an expected output of the vocoder to obtain the trained vocoder, where the trained vocoder is for converting the acoustic features of the target voice to obtain the target voice.

In this embodiment, each of the above-mentioned modules is implemented in the form of software, which can be computer program(s) stored in a memory of the voice conversion apparatus and executable on a processor of the voice conversion apparatus. In other embodiments, each of the above-mentioned modules may be implemented in the form of hardware (e.g., a circuit of the voice conversion apparatus which is coupled to the processor of the voice conversion apparatus) or a combination of hardware and software (e.g., a circuit with a single chip microcomputer).

A computer-readable storage medium storing a computer program is provided. When the computer program is executed by a processor, the processor executes the following steps: obtaining a to-be-converted voice, and extracting acoustic features of the to-be-converted voice; obtaining a source vector corresponding to the to-be-converted voice from a source vector pool, and selecting a target vector corresponding to the target voice from the target vector pool; obtaining acoustic features of the target voice output by the voice conversion model by using the acoustic features of the to-be-converted voice, the source vector corresponding to the to-be-converted voice, and the target vector corresponding to the target voice as an input of the voice conversion model; and obtaining the target voice by converting the acoustic features of the target voice using a vocoder.

In one embodiment, the step of obtaining the source vector corresponding to the to-be-converted voice from the source vector pool, and selecting the target vector corresponding to the target voice from the target vector pool includes: obtaining a source voice identifier corresponding to the to-be-converted voice, and obtaining the source vector corresponding to the to-be-converted voice from the source vector pool according to the source voice identifier; and obtaining a target voice identifier corresponding to a target voice, and selecting the target vector corresponding to the target voice from the target vector pool according to the target voice identifier.

In one embodiment, the voice conversion model is obtained through steps of: obtaining a to-be-trained source vector pool corresponding to voices of a plurality of source speakers, and obtaining a to-be-trained target vector pool corresponding to voices of a plurality of target speakers, where the to-be-trained source vector pool includes a to-be-trained source vector of the voice of each of the source speakers, and the to-be-trained target vector pool includes the to-be-trained target vector of the voice of each of the target speakers; obtaining a training sample pair set, where the training sample pair set includes a plurality of training sample pairs, and each of the training sample pairs includes a training voice sample corresponding to a source speaker and a training target voice sample corresponding to a target speaker; extracting the acoustic features of the training voice sample, and extracting the acoustic features of the training target voice sample; and training a to-be-trained voice conversion model by using the acoustic features of the training voice sample, the to-be-trained source vector corresponding to the voice of the source speaker, and the to-be-trained target vector of the voice of the target speaker as an input of the to-be-trained voice conversion model and using the acoustic features of the training target voice sample as an expected output of the to-be-trained to obtain a trained voice conversion model.

In one embodiment, the step of training the to-be-trained voice conversion model by using the acoustic features of the training voice sample, the to-be-trained source vector corresponding to the voice of the source speaker, and the to-be-trained target vector of the voice of the target speaker as the input of the to-be-trained voice conversion model and using the acoustic features of the training target voice sample as the expected output of the to-be-trained to obtain the trained voice conversion model includes: obtaining actual voice acoustic features outputted by the to-be-trained voice conversion model by using the acoustic features of the training voice sample, the to-be-trained source vector corresponding to the voice of the source speaker, and the to-be-trained target vector of the voice of the target speaker as the input of the to-be-trained voice conversion model; calculating a loss value according to the acoustic features of the training target voice sample and the actual voice acoustic feature; and updating parameters in the to-be-trained voice conversion model, the to-be-trained source vector, and the to-be-trained target vector according to the loss value until the loss value reaches a preset convergence condition to use the updated to-be-trained voice conversion model as a target voice conversion model, using the updated to-be-trained source vector as the source vector in the trained source vector pool, and using the updated to-be-trained target vector as the target vector in the trained target vector pool.

In one embodiment, after the step of extracting the acoustic features of the training voice sample, and extracting the acoustic features of the training target voice sample further includes: aligning the acoustic features of the training voice sample with the acoustic features of the training target voice sample; and obtaining the acoustic features of the aligned training voice sample according to a result of the aligning, and using the acoustic features of the aligned training voice samples as the input of the to-be-trained voice conversion model.

In one embodiment, the step of obtaining the to-be-converted voice, and extracting acoustic features of the to-be-converted voice includes: converting the to-be-converted voice to obtain the to-be-converted acoustic features corresponding to the to-be-converted voice; and calculating the acoustic features of the to-be-converted voice according to the to-be-converted acoustic features.

In one embodiment, the vocoder is obtained through steps of: obtaining voice data of a plurality of target speakers, and extracting the acoustic features and a vector corresponding to the voice data of each of the target speakers; and training the vocoder by using parameters in the vocoder, the acoustic feature, and the vector as an input of the vocoder and using the voice data of the corresponding target speaker as an expected output of the vocoder to obtain the trained vocoder, where the trained vocoder is for converting the acoustic features of the target voice to obtain the target voice.

It can be understood by those skilled in the art that, all or part of the process of the method of the above-mentioned embodiment can be implemented by a computer program to instruct related hardware. The program can be stored in a non-volatile computer readable storage medium. When the program is executed, which can include the process of each method embodiment as described above. In which, any reference to a storage, a memory, a database or other medium used in each embodiment provided by the present disclosure may include non-volatile and/or volatile memory. Non-volatile memory can include read only memory (ROM), programmable ROM (PROM), electrically programmable ROM (EPROM), electrically erasable programmable ROM (EEPROM), or flash memory. Volatile memory can include random access memory (RAM) or external cache memory. As a description rather than a limitation, RAM can be in a variety of formats such as static RAM (SRAM), dynamic RAM (DRAM), synchronous DRAM (SDRAM), double data rate SDRAM (DDRSDRAM), enhanced SDRAM (ESDRAM), synchronous link DRAM (SLDRAM), rambus direct RAM (RDRAM), direct rambus DRAM (DRDRAM), and rambus DRAM (RDRAM).

The technical features of the above-mentioned embodiments can be arbitrarily combined. For the sake of brevity of description, the descriptions do not include all possible combinations of the technical features in the above-mentioned embodiments. However, the combination of these technical features will be considered to be within the scope described in this specification as long as there is no contradiction.

The above-mentioned embodiments are merely illustrative of several embodiments of the present disclosure. Although the description is specific and detailed, it should not to be comprehended as limiting the scope of the present disclosure. It should be noted that, for those skilled in the art, a number of variations and improvements can still be made without departing from the spirit and scope of the present disclosure. Therefore, the scope of the present disclosure should be determined by the appended claims.

What is claimed is:

1. A voice conversion method, comprising steps of:
obtaining a to-be-converted voice, and extracting acoustic features of the to-be-converted voice;
obtaining a source vector corresponding to the to-be-converted voice from a source vector pool, and selecting a target vector corresponding to the target voice from the target vector pool; wherein the source vector pool refers to a vector pool corresponding to voices of a plurality of source speakers, the source vector pool is obtained through training and comprises a plurality of source vectors corresponding to the voices of the plurality of source speakers, and each source vector is a vector representing timbre characteristics corresponding to each source speaker; and wherein the target vector pool refers to a vector pool corresponding to voices of a plurality of target speakers, the target vector pool is obtained through training and comprises a plurality of target vectors corresponding to voices of a plurality of target speakers, and each target vector refers to a vector representing timbre characteristics corresponding to each target speaker;
obtaining acoustic features of the target voice output by a voice conversion model by using the acoustic features of the to-be-converted voice, the source vector corresponding to the to-be-converted voice, and the target vector corresponding to the target voice as an input of the voice conversion model; and
obtaining the target voice by converting the acoustic features of the target voice using a vocoder;
wherein the voice conversion model is obtained through steps of:
obtaining a to-be-trained source vector pool corresponding to voices of a plurality of source speakers, and obtaining a to-be-trained target vector pool corresponding to voices of a plurality of target speakers, wherein the to-be-trained source vector pool comprises a to-be-trained source vector of the voice of each of the source speakers, and the to-be-trained target vector pool comprises the to-be-trained target vector of the voice of each of the target speakers;
obtaining a training sample pair set, wherein the training sample pair set comprises a plurality of training sample pairs, and each of the training sample pairs comprises a training voice sample corresponding to a source speaker and a training target voice sample corresponding to a target speaker, and wherein the training voice sample corresponding to the source speaker comprises: acoustic features of a voice of each source speaker and a to-be-trained source vector corresponding to the voice of each source speaker, and the training target voice sample corresponding to the target speaker comprises: acoustic features of a voice of each target speaker and a to-be-trained target vector corresponding to the voice of the target speaker:
extracting the acoustic features of the training voice sample, and extracting the acoustic features of the training target voice sample, wherein the acoustic features of the training voice sample comprise: a Mel-frequency cepstrum and unvoiced/voiced information of the training voice sample, and the acoustic features of the training target voice sample comprise: a Mel-frequency cepstrum and unvoiced/voiced information of the training target voice sample; and
training a to-be-trained voice conversion model by using the acoustic features of the training voice sample, the to-be-trained source vector corresponding to the voice of the source speaker, and the to-be-trained target vector of the voice of the target speaker as an input of the to-be-trained voice conversion model and using the acoustic features of the training target voice sample as an expected output of the to-be-trained voice conversion model to obtain a trained voice conversion model.

2. The method of claim 1, wherein the to-be-converted voice are voices of source speakers among the voices of the plurality of source speakers, the target voice are voices of target speakers among the voices of the plurality of target speakers selected by a user, and the step of obtaining the source vector corresponding to the to-be-converted voice from the source vector pool, and selecting the target vector corresponding to the target voice from the target vector pool comprises:
  obtaining a source voice identifier corresponding to the to-be-converted voice, and obtaining the source vector corresponding to the to-be-converted voice from the source vector pool according to the source voice identifier; and
  obtaining a target voice identifier corresponding to a target voice, and selecting the target vector corresponding to the target voice from the target vector pool according to the target voice identifier.

3. The method of claim 1, wherein the step of training the to-be-trained voice conversion model by using the acoustic features of the training voice sample, the to-be-trained source vector corresponding to the voice of the source speaker, and the to-be-trained target vector of the voice of the target speaker as the input of the to-be-trained voice conversion model and using the acoustic features of the training target voice sample as the expected output of the to-be-trained to obtain the trained voice conversion model comprises:
  obtaining actual voice acoustic features outputted by the to-be-trained voice conversion model by using the acoustic features of the training voice sample, the to-be-trained source vector corresponding to the voice of the source speaker, and the to-be-trained target vector of the voice of the target speaker as the input of the to-be-trained voice conversion model;
  calculating a loss value according to the acoustic features of the training target voice sample and the actual voice acoustic features; and
  updating parameters in the to-be-trained voice conversion model, the to-be-trained source vector, and the to-be-trained target vector according to the loss value until the loss value reaches a preset convergence condition to use the updated to-be-trained voice conversion model as a target voice conversion model, using the updated to-be-trained source vector as the source vector in the trained source vector pool, and using the updated to-be-trained target vector as the target vector in the trained target vector pool, wherein the parameters in the to-be-trained voice conversion model comprise a parameter matrix, and the preset convergence condition comprises: a training being converged in a case of the actual voice acoustic features being equal to the acoustic features of the training target voice sample.

4. The method of claim 1, wherein after the step of extracting the acoustic features of the training voice sample, and extracting the acoustic features of the training target voice sample, the method further comprises:
  aligning the acoustic features of the training voice sample with the acoustic features of the training target voice sample; and
  obtaining the acoustic features of the aligned training voice sample according to a result of the aligning, and using the acoustic features of the aligned training voice samples as the input of the to-be-trained voice conversion model.

5. The method of claim 1, wherein the step of obtaining the to-be-converted voice, and extracting acoustic features of the to-be-converted voice comprises:
  converting the to-be-converted voice to obtain the to-be-converted acoustic features corresponding to the to-be-converted voice, wherein the to-be-converted acoustic features comprise: a frequency spectrum, a fundamental frequency and a non-periodic frequency; and
  calculating the acoustic features of the to-be-converted voice according to the to-be-converted acoustic features, wherein the acoustic features of the to-be-converted voice comprise: a Mel-frequency cepstrum, a fundamental frequency logarithm and unvoiced/voiced information.

6. The method of claim 1, wherein the vocoder is obtained through steps of:
  obtaining voice data of a plurality of target speakers, and extracting the acoustic features and a vector corresponding to the voice data of each of the target speakers; and
  training the vocoder by using parameters in the vocoder, the acoustic feature, and the vector as an input of the vocoder and using the voice data of the corresponding target speaker as an expected output of the vocoder to obtain the trained vocoder, wherein the trained vocoder is for converting the acoustic features of the target voice to obtain the target voice.

7. A voice conversion apparatus, comprising:
  a memory;
  a processor; and
  one or more computer programs stored in the memory and executable on the processor; wherein the one or more computer programs comprise:
  instructions for obtaining a to-be-converted voice, and extracting acoustic features of the to-be-converted voice;
  instructions for obtaining a source vector corresponding to the to-be-converted voice from a source vector pool, and selecting a target vector corresponding to the target voice from the target vector pool; wherein the source vector pool refers to a vector pool corresponding to voices of a plurality of source speakers, the source vector pool is obtained through training and comprises a plurality of source vectors corresponding to the voices of the plurality of source speakers, and each source vector is a vector representing timbre characteristics corresponding to each source speaker; and wherein the target vector pool refers to a vector pool corresponding to voices of a plurality of target speakers, the target vector pool is obtained through training and comprises a plurality of target vectors corresponding to voices of a plurality of target speakers, and each target vector refers to a vector representing timbre characteristics corresponding to each target speaker;
  instructions for obtaining acoustic features of the target voice output by a voice conversion model by using the acoustic features of the to-be-converted voice, the source vector corresponding to the to-be-converted voice, and the target vector corresponding to the target voice as an input of the voice conversion model; and
  instructions for obtaining the target voice by converting the acoustic features of the target voice using a vocoder;
  wherein the voice conversion model is obtained through:
    instructions for obtaining a to-be-trained source vector pool corresponding to voices of a plurality of source speakers, and obtaining a to-be-trained target vector pool corresponding to voices of a plurality of target speakers, wherein the to-be-trained source vector pool comprises a to-be-trained source vector of the voice of each of the source speakers, and the to-be-trained target vector pool comprises the to-be-trained target vector of the voice of each of the target speakers;

instructions for obtaining a training sample pair set, wherein the training sample pair set comprises a plurality of training sample pairs, and each of the training sample pairs comprises a training voice sample corresponding to a source speaker and a training target voice sample corresponding to a target speaker, and wherein the training voice sample corresponding to the source speaker comprises: acoustic features of a voice of each source speaker and a to-be-trained source vector corresponding to the voice of each source speaker, and the training target voice sample corresponding to the target speaker comprises: acoustic features of a voice of each target speaker and a to-be-trained target vector corresponding to the voice of the target speaker;

instructions for extracting the acoustic features of the training voice sample, and extracting the acoustic features of the training target voice sample, wherein the acoustic features of the training voice sample comprise: a Mel-frequency cepstrum and unvoiced/voiced information of the training voice sample, and the acoustic features of the training target voice sample comprise: a Mel-frequency cepstrum and unvoiced/voiced information of the training target voice sample; and instructions for training a to-be-trained voice conversion model by using the acoustic features of the training voice sample, the to-be-trained source vector corresponding to the voice of the source speaker, and the to-be-trained target vector of the voice of the target speaker as an input of the to-be-trained voice conversion model and using the acoustic features of the training target voice sample as an expected output of the to-be-trained voice conversion model to obtain a trained voice conversion model.

8. The apparatus of claim 7, wherein the instructions for obtaining the source vector corresponding to the to-be-converted voice from the source vector pool, and selecting the target vector corresponding to the target voice from the target vector pool comprise:

instructions for obtaining a source voice identifier corresponding to the to-be-converted voice, and obtaining the source vector corresponding to the to-be-converted voice from the source vector pool according to the source voice identifier; and instructions for obtaining a target voice identifier corresponding to a target voice, and selecting the target vector corresponding to the target voice from the target vector pool according to the target voice identifier.

9. The apparatus of claim 7, wherein the instructions for training the to-be-trained voice conversion model by using the acoustic features of the training voice sample, the to-be-trained source vector corresponding to the voice of the source speaker, and the to-be-trained target vector of the voice of the target speaker as the input of the to-be-trained voice conversion model and using the acoustic features of the training target voice sample as the expected output of the to-be-trained to obtain the trained voice conversion model comprise:

instructions for obtaining actual voice acoustic features outputted by the to-be-trained voice conversion model by using the acoustic features of the training voice sample, the to-be-trained source vector corresponding to the voice of the source speaker, and the to-be-trained target vector of the voice of the target speaker as the input of the to-be-trained voice conversion model;

instructions for calculating a loss value according to the acoustic features of the training target voice sample and the actual voice acoustic feature; and instructions for updating parameters in the to-be-trained voice conversion model, the to-be-trained source vector, and the to-be-trained target vector according to the loss value until the loss value reaches a preset convergence condition to use the updated to-be-trained voice conversion model as a target voice conversion model, using the updated to-be-trained source vector as the source vector in the trained source vector pool, and using the updated to-be-trained target vector as the target vector in the trained target vector pool.

10. The apparatus of claim 8, wherein the one or more computer programs further comprises:

instructions for aligning the acoustic features of the training voice sample with the acoustic features of the training target voice sample; and instructions for obtaining the acoustic features of the aligned training voice sample according to a result of the aligning, and using the acoustic features of the aligned training voice samples as the input of the to-be-trained voice conversion model.

11. The apparatus of claim 7, wherein the instructions for obtaining the to-be-converted voice, and extracting acoustic features of the to-be-converted voice comprise:

instructions for converting the to-be-converted voice to obtain the to-be-converted acoustic features corresponding to the to-be-converted voice; and instructions for calculating the acoustic features of the to-be-converted voice according to the to-be-converted acoustic features.

12. The apparatus of claim 7, wherein the vocoder is obtained through:

instructions for obtaining voice data of a plurality of target speakers, and extracting the acoustic features and a vector corresponding to the voice data of each of the target speakers; and instructions for training the vocoder by using parameters in the vocoder, the acoustic feature, and the vector as an input of the vocoder and using the voice data of the corresponding target speaker as an expected output of the vocoder to obtain the trained vocoder, wherein the trained vocoder is for converting the acoustic features of the target voice to obtain the target voice.

13. A non-transitory computer readable storage medium storing instructions executable on a process, wherein the instructions comprise:

instructions for obtaining a to-be-converted voice, and extracting acoustic features of the to-be-converted voice;

instructions for obtaining a source vector corresponding to the to-be-converted voice from a source vector pool, and selecting a target vector corresponding to the target voice from the target vector pool; wherein the source vector pool refers to a vector pool corresponding to voices of a plurality of source speakers, the source vector pool is obtained through training and comprises a plurality of source vectors corresponding to the voices of the plurality of source speakers, and each source vector is a vector representing timbre characteristics corresponding to each source speaker; and wherein the target vector pool refers to a vector pool corresponding to voices of a plurality of target speakers, the target vector pool is obtained through training and comprises a plurality of target vectors corresponding to voices of a plurality of target speakers, and each target vector refers to a vector representing timbre characteristics corresponding to each target speaker;

instructions for obtaining acoustic features of the target voice output by a voice conversion model by using the acoustic features of the to-be-converted voice, the source vector corresponding to the to-be-converted voice, and the target vector corresponding to the target voice as an input of the voice conversion model; and instructions for obtaining the target voice by converting the acoustic features of the target voice using a vocoder;

wherein the voice conversion model is obtained through:

instructions for obtaining a to-be-trained source vector pool corresponding to voices of a plurality of source speakers, and obtaining a to-be-trained target vector pool corresponding to voices of a plurality of target speakers, wherein the to-be-trained source vector pool comprises a to-be-trained source vector of the voice of each of the source speakers, and the to-be-trained target vector pool comprises the to-be-trained target vector of the voice of each of the target speakers;

instructions for obtaining a training sample pair set, wherein the training sample pair set comprises a plurality of training sample pairs, and each of the training sample pairs comprises a training voice sample corresponding to a source speaker and a training target voice sample corresponding to a target speaker, and wherein the training voice sample corresponding to the source speaker comprises: acoustic features of a voice of each source speaker and a to-be-trained source vector corresponding to the voice of each source speaker, and the training target voice sample corresponding to the target speaker comprises: acoustic features of a voice of each target speaker and a to-be-trained target vector corresponding to the voice of the target speaker;

instructions for extracting the acoustic features of the training voice sample, and extracting the acoustic features of the training target voice sample, wherein the acoustic features of the training voice sample comprise: a Mel-frequency cepstrum and unvoiced/voiced information of the training voice sample, and the acoustic features of the training target voice sample comprise: a Mel-frequency cepstrum and unvoiced/voiced information of the training target voice sample; and instructions for training a to-be-trained voice conversion model by using the acoustic features of the training voice sample, the to-be-trained source vector corresponding to the voice of the source speaker, and the to-be-trained target vector of the voice of the target speaker as an input of the to-be-trained voice conversion model and using the acoustic features of the training target voice sample as an expected output of the to-be-trained voice conversion model to obtain a trained voice conversion model.

14. The storage medium of claim 13, wherein the instructions for obtaining the source vector corresponding to the to-be-converted voice from the source vector pool, and selecting the target vector corresponding to the target voice from the target vector pool comprise:

instructions for obtaining a source voice identifier corresponding to the to-be-converted voice, and obtaining the source vector corresponding to the to-be-converted voice from the source vector pool according to the source voice identifier; and instructions for obtaining a target voice identifier corresponding to a target voice, and selecting the target vector corresponding to the target voice from the target vector pool according to the target voice identifier.

15. The storage medium of claim 13, wherein the instructions for training the to-be-trained voice conversion model by using the acoustic features of the training voice sample, the to-be-trained source vector corresponding to the voice of the source speaker, and the to-be-trained target vector of the voice of the target speaker as the input of the to-be-trained voice conversion model and using the acoustic features of the training target voice sample as the expected output of the to-be-trained to obtain the trained voice conversion model comprise:

instructions for obtaining actual voice acoustic features outputted by the to-be-trained voice conversion model by using the acoustic features of the training voice sample, the to-be-trained source vector corresponding to the voice of the source speaker, and the to-be-trained target vector of the voice of the target speaker as the input of the to-be-trained voice conversion model;

instructions for calculating a loss value according to the acoustic features of the training target voice sample and the actual voice acoustic feature; and instructions for updating parameters in the to-be-trained voice conversion model, the to-be-trained source vector, and the to-be-trained target vector according to the loss value until the loss value reaches a preset convergence condition to use the updated to-be-trained voice conversion model as a target voice conversion model, using the updated to-be-trained source vector as the source vector in the trained source vector pool, and using the updated to-be-trained target vector as the target vector in the trained target vector pool.

16. The storage medium of claim 13, wherein the one or more computer programs further comprise:

instructions for aligning the acoustic features of the training voice sample with the acoustic features of the training target voice sample; and instructions for obtaining the acoustic features of the aligned training voice sample according to a result of the aligning, and using the acoustic features of the aligned training voice samples as the input of the to-be-trained voice conversion model.

17. The storage medium of claim 13, wherein the instructions for obtaining the to-be-converted voice, and extracting acoustic features of the to-be-converted voice comprises:

instructions for converting the to-be-converted voice to obtain the to-be-converted acoustic features corresponding to the to-be-converted voice; and instructions for calculating the acoustic features of the to-be-converted voice according to the to-be-converted acoustic features.

* * * * *